Figure 3:
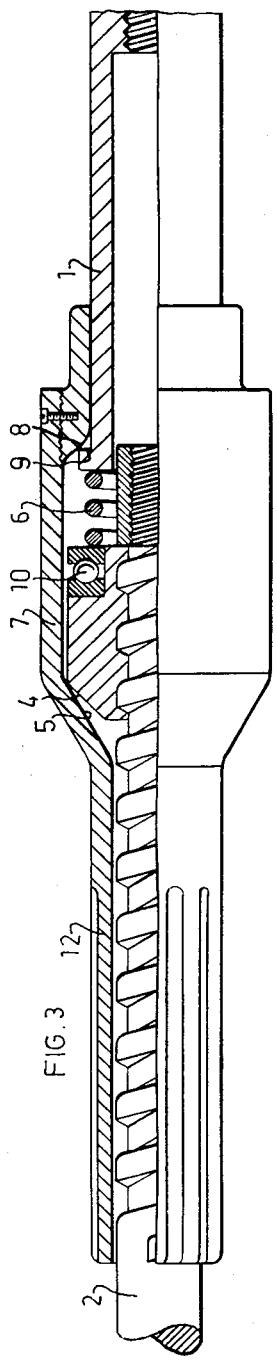

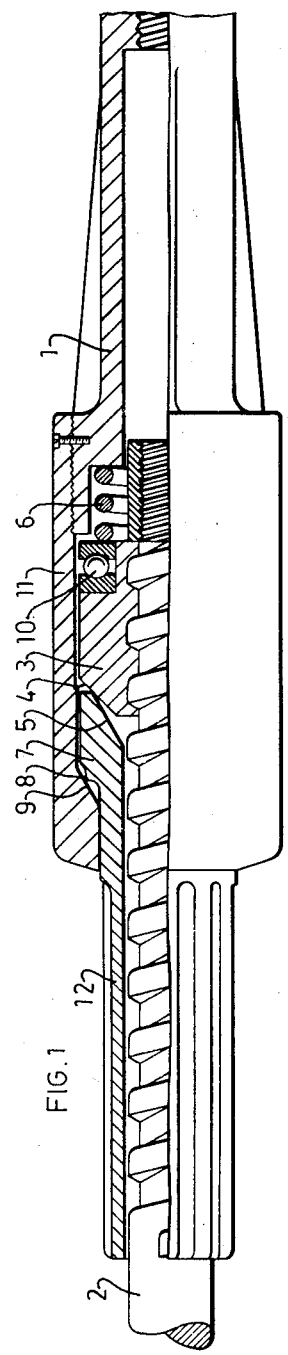
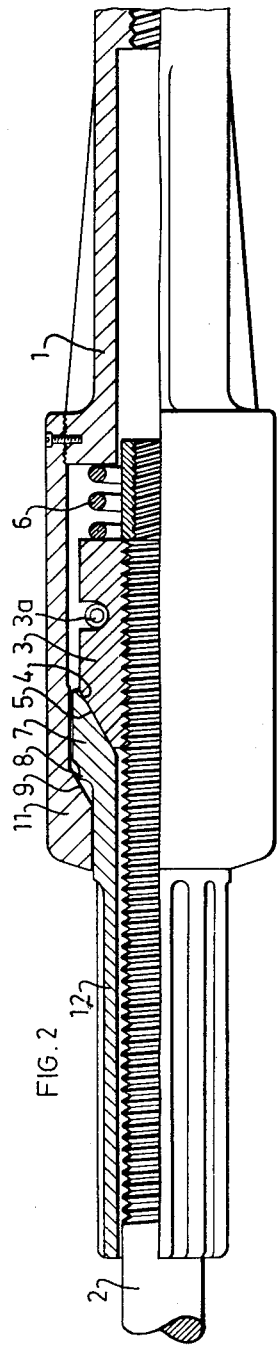

May 28, 1963

N. B. L. SANDER 3,091,311

AUTOMATICALLY SINGLE-ACTING SLACK
ADJUSTERS FOR VEHICLES

Filed July 19, 1962

2 Sheets-Sheet 2

United States Patent Office 3,091,311
Patented May 28, 1963

3,091,311
AUTOMATICALLY SINGLE-ACTING SLACK
ADJUSTERS FOR VEHICLES
Nils Börje Lennart Sander, Malmo, Sweden, assignor to Svenska Aktiebolaget Bromsregulator, Malmo, Sweden, a corporation of Sweden
Filed July 19, 1962, Ser. No. 211,008
Claims priority, application Sweden July 20, 1961
5 Claims. (Cl. 188—196)

This invention relates to an automatically single-acting brake slack adjuster for vehicles, i.e. a brake slack adjuster of the type which automatically takes up the slack in the brake rigging when it has become too large, for instance owing to wear, but which does not automatically pay out brake slack when it has become too small, for instance when new parts of the brake have been substituted for worn ones. As it is necessary, however, to pay out brake slack when it has become too small, a vehicle brake including an automatically single-acting slack adjuster must allow such pay-out to be effected by hand. It should be possible to effect any required adjustment of the brake slack by hand in a convenient and riskless manner on the automatically single-acting brake slack adjuster. The invention has for its object to combine in itself a far-reaching realization of this possibility with an extremely simple and reliable construction of an automatically single-acting brake slack adjuster of a type which has already proven its efficacy and which comprises a brake rod including a tubular rod part and a threaded rod part which is axially movable in the tubular rod part and connected thereto by mechanism comprising a nut rotatably engaging the threaded rod part, an abutment connected to the tubular rod part and coacting with an abutment on said nut, and a spring normally holding the tubular rod part abutment and the nut engaged with each other.

In an automatically single-acting brake slack adjuster of this type, the said two parts of the brake rod, when the latter is mounted in place in a brake rigging for partaking in the transmission of the brake power from the source thereof to brake shoes or like brake means, are connected in the brake rigging so as to be non-rotatable about the longitudinal axis of the brake rod. It is possible to rotate the threaded rod part for adjusting the brake slack by hand but this requires detachment of the rod part from its connection in the brake rigging, which—as shown by experience—involves considerable work and the risk of the detached connection not being correctly assembled again or of some part of it being lost and replaced by some improvised element which is not up to the safety standard of the other elements. This is especially true when the automatically single-acting brake slack adjuster is employed in the brake system of a motor vehicle, such as a truck or bus, which one should be able to entrust to the care of any car repair shop whatever for inspection and overhauling whenever some failure occurs. It is one of the objects of the invention that it shall be possible to effect an adjustment of the brake slack by hand on an automatically single-acting brake slack adjuster of the kind referred to above without any detachment of the slack adjuster brake rod or of the connection of any of the rod parts in the brake rigging of which said brake rod forms part. The brake rod can be constructed either as a brake pull rod or as a brake push rod according as it is arranged to be subject to pull or push by the brake power it is to transmit upon braking.

The brake slack adjuster according to the invention, in the widest scope thereof, is characterised by the combination that the abutment coacting with the abutment on the nut is disposed on a part rotatable by hand about the longitudinal axis of the brake rod, that said rotatable part has an abutment coacting with an abutment on the tubular rod part, and that the coacting abutments on the tubular rod part and the rotatable part as well as the coacting abutments on the rotatable part and the nut constitute friction clutches between the tubular rod part and the rotatable part and between said rotatable part and the nut, respectively, said friction clutches being normally held engaged by the spring interposed between the nut and the tubular rod part. This arrangement in which the nut transmits the brake power between the relatively axially movable rod parts via the said rotatable part, can be realized in practice in structurally simple forms in which the rotatable part is a sleeve which is provided with the abutments facing, as viewed axially, in opposite directions and coacting with the abutments on the nut and the tubular rod part, respectively, said sleeve being rotatably mounted in or on the tubular rod part and equipped with a tubular extension which serves as a protective tube around the threads of the threaded rod part and which is readily grasped for rotation of the sleeve either direct by hand or with the aid of some ordinary hand tool. In such a form of the slack adjuster according to the invention the abutment on the tubular rod part coacting with one of the abutments on the sleeve is located in an enlarged portion of the tubular rod part at the end thereof receiving the threaded rod part, said enlarged portion being shaped so as to form a bearing for the sleeve and a housing for the nut and the spring. In another form the rotatable sleeve forms a housing for the nut and the spring and is mounted at one end on the tubular rod part and provided with the tubular extension at its other end. In all forms the lead of the threaded rod part and of the nut screwed thereonto may be either non-selflocking or selflocking. In the former case the nut is undivided, and in the latter case it is divided into a number of segments which are held resiliently together and which at the automatically occurring adjusting movement between the tubular rod part and the threaded rod part are urged out of and slide over the threads of the threaded rod part, which in its instance act as the teeth of a rack. Divided or undivided, the nut is rotated and thereby axially displaced on the threaded rod part at adjustment of the brake slack by hand. At such adjustment the rotatable sleeve is rotated by hand, and the friction clutch between the sleeve and the nut carries the nut along in the rotation under slipping of the friction clutch between the sleeve and the tubular rod part. The two said friction clutches in combination efficiently prevent unintentional rotation of the nut on the threaded rod part under the influence of vibrations when there is no braking stress in the brake rod. With braking stress in the brake rod the two friction clutches are compressed not only by the spring normally holding them engaged but also by the braking stress, thereby safely locking the nut in its position on the threaded rod part.

The above and further features of the invention as well as the advantages thereof will appear from the following detailed description, reference being made to the accompanying drawings illustrating some forms, chosen by way of example, of the brake slack adjuster. In the drawings:

FIGS. 1, 2 and 3 are side views, partly in longitudinal section, of three different forms of a brake slack adjuster comprising a brake pull rod.

Figure 4:
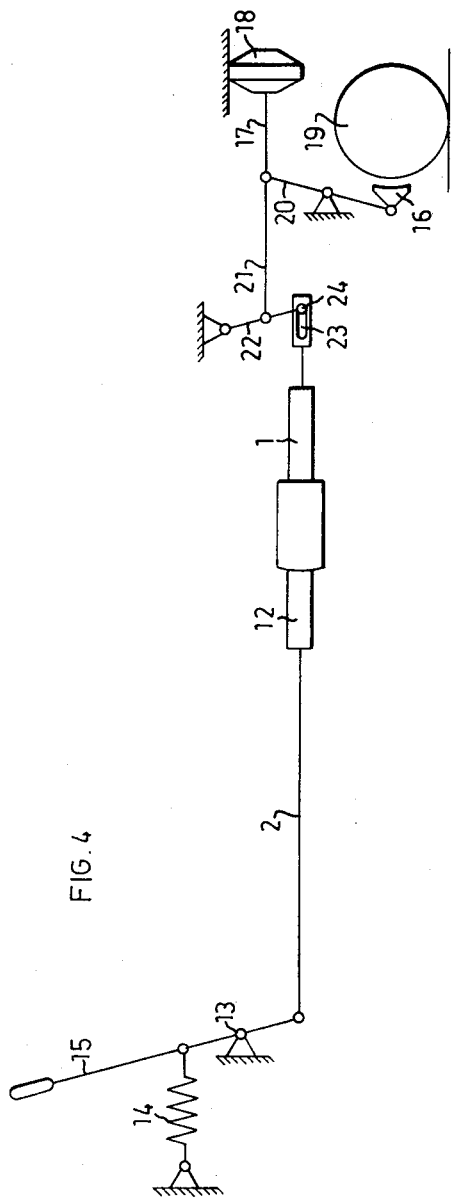

FIG. 4 diagrammatically shows how this brake pull rod can be arranged, to particular advantage, in the brake rigging of a vehicle brake.

In the drawings, 1 denotes the tubular rod part, 2 the threaded rod part which is axially movable in the tubular rod part, and 3 the nut rotatably meshing with the threads of the threaded rod part 2. In the forms of FIGS. 1 and 3 the rod part 1 and the nut 3 are square-threaded and of such a lead that the threads are non-selflocking. In the form of FIG. 2 the coacting threads of the threaded rod part 2 and the nut 3 are selflocking, and the nut is divided into a number of segments held together by a spring 3a disposed around said segments. Normally, i.e. when there is no braking stress in the brake rod, the nut 3 with an abutment surface 4 thereon is held applied by a pressure spring 6 against an abutment surface 5 connected to the tubular rod part 1, said pressure spring 6 being interposed between the nut and the tubular rod part. The abutment surface 5 is arranged on a sleeve 7 which is rotatable about the longitudinal axis of the brake rod in relation to the two relatively axially movable rod parts 1 and 2. The sleeve 7 is provided with an abutment surface 8 which, as viewed axially, faces in the opposite direction to the abutment surface 5. The spring 6 normally holds the sleeve 7 with its abutment surface 8 applied against an abutment surface 9 on the tubular rod part 1. The coacting abutment surfaces 4 and 5 and the coacting abutment surfaces 8 and 9 form friction clutches between respectively the nut and the sleeve 7 and said sleeve and the tubular rod part 1, both of which clutches are normally held engaged by the spring 6. In the forms of FIGS. 1 and 3 an antifriction thrust bearing 10 is inserted between the spring 6 and the nut 3. In the form of FIG. 2 the coacting abutment and friction clutch surfaces 4, 5 are suitably shaped to prevent the resiliently kept-together nut segments from moving radially out of engagement with the threads of the threaded rod part when these surfaces are kept engaged with each other by the spring 6. In the form of FIGS. 1 and 2 the abutment and friction clutch surface 9 on the tubular rod part 1 is provided in an enlarged portion 11 of said rod part at the end thereof receiving the threaded rod part 2. Said enlarged portion 11 constitutes a bearing for the sleeve 7 and a housing for the nut 3 and the spring 6. In the form of FIG. 3 the sleeve 7 is rotatably mounted at one end on the tubular rod part 1 and constitutes a housing for the nut 3, the spring 6 and the antifriction thrust bearing 10. In all forms the sleeve 7 has a tubular extension 12 which forms a protective tube around the threads of the threaded rod part 2 and is readily accessible and suitably shaped for rotating the sleeve 7 by hand.

FIG. 4 diagrammatically shows an example of a particularly advantageous way of arranging the above brake slack adjuster in a vehicle having both a hand brake and a power or foot brake as well as brake shoes or other brake means common to both. In this example the slack adjuster brake pull rod 1, 2 connects a hand-brake lever 15 fulcrumed at 13 and acted upon by a return spring 14 to the brake rigging over which the foot or power brake operates brake means indicated by a brake shoe 16. These brake means as well as the said brake rigging may be of any kind whatever. According to the diagrammatically shown example the foot or power brake rigging comprises a push rod 17 which transmits the brake power from the source 18 thereof to a brake lever 20 for applying the brake shoe 16 to a brake drum 19 and is coupled by a rod 21 to a lever 22 on which the hand-brake pull rod 1, 2 acts through a lost motion connection having an elongate hole 23 in the rod part 1 for a pin 24 connecting the rod part 1 to the lever 22. The lost motion longitudinally of the brake rod 1, 2 of this connection corresponds to the normal brake slack of the foot or power brake.

With the arrangement exemplified in FIG. 4 the slack adjuster according to the invention functions as follows. The wear of the brake means results in an increase of the outward movement of the push rod 17 required for causing the brake means to be applied against the brake drum. In the absence of an automatic slack adjuster, the customary difference between the transmission ratios of the foot or power brake rigging and of the hand-brake rigging makes the increase in stroke length greater in the hand-brake rigging than in the foot or power brake rigging. As a consequence, there is the risk that the hand-brake rigging will fail to function even though the foot or power brake functions perfectly. According as the outward movement of the push rod 17 to the left in FIG. 4 is increased by reason of the wear of the brake means 16, the pin 24 during braking will move the brake rod 1 having the elongate hole 23 to the left in FIG. 4, whereby a thrust arises in the rod 1, 2.

When this thrust exceeds that of the spring 6 the locking of the nut 3—in the forms of FIGS. 1 and 3—by the friction clutch surfaces 4, 5 will cease and the nut 3 will rotate on the threads of the rod part 2, whereby the rod part 1 is moved to the left relative to the rod part 2. In the form of FIG. 2 the ability of the surface 5 to keep the segments of the nut 3 together will cease when the spring 6 yields. The nut segments will then slide over the threads of the threaded rod part 2, and the rod part 1 will be moved to the left relative to the rod part 2.

Irrespectively of whether or not the hand-brake system is used for braking, the slack adjuster brake rod 1, 2 in said system will be shortened to compensate for the wear arisen at foot or power braking, and so the lost motion provided for in the connection of the slack adjuster brake rod 1, 2 to the rigging of the foot controlled brake will determine the slack of the hand brake.

To permit mounting new brake means 16 to replace old ones it must be possible to increase the length of the rod 1, 2 manually. This can be realized without any detachment whatever of any constituent of the hand brake, for it can be produced by rotating the rotatable sleeve 7 either direct by hand or with the aid of some suitable hand tool. This simple work which is rapidly effected, requires no precision, for it does not matter whether the pull rod 1, 2 is lengthened more than necessary since a too large length will be automatically corrected by the brake slack adjuster upon braking with the foot or power brake. The brake slack adjuster mounted in the hand-brake rigging operates in this way even if such an adjuster is mounted also in the foot or power brake rigging. In a power brake system in which for instance compressed air is used as the power medium, the supply of this medium can naturally be controlled by a pedal adapted to be acted upon in the same way as the brake pedal in a customary foot brake where the brake power is produced by the pressure on the brake pedal.

What I claim and desire to secure by Letters Patent is:

1. An automatically single-acting brake slack adjuster for vehicles, comprising, in combination, a two-part brake rod, one part of said two-part brake rod being tubular and the other being threaded and axially movable in said tubular rod part, and mechanism connecting said two rod parts and comprising a nut rotatably engaging said threaded rod part, a member rotatable about the longitudinal axis of said two-part brake rod in relation to said two parts thereof, two abutments facing in opposite directions on said rotatable member, abutments on said tubular rod part and on said nut, coacting each with one of said abutments on said rotatable member for transmitting brake power between said tubular rod part and said nut on said threaded rod part through said rotatable member, a spring interposed between said tubular rod part and said nut for normally holding said nut with said abutment thereon engaged with said coacting abutment on said rotatable member, said coacting abutments on said tubular rod part and said rotatable member as well as said coacting abutments on said rotatable member and said nut forming friction clutches between said tubular rod part and said rotatable member and between said rotatable member and said nut, respectively, and both said friction clutches being normally held engaged by said spring between said tubular rod part and said nut.

2. An automatically single-acting brake slack adjuster as claimed in claim 1, in which said rotatable member is a sleeve rotatably connected at one end with said tubular rod part, and in which said sleeve at its other end has a projecting tubular extension forming a protective tube around the threads of said threaded rod part.

3. An automatically single-acting brake slack adjuster as claimed in claim 1, in which said rotatable member is a sleeve, and in which said tubular rod part has an enlarged portion which houses said nut and in which said sleeve is rotatably fitted at one end, said sleeve having at its other end a projecting tubular extension forming a protective tube around the threads of said threaded rod part.

4. An automatically single-acting brake slack adjuster as claimed in claim 1, in which said rotatable member is a sleeve which at one end is rotatably mounted on said tubular rod part and which houses said nut and said spring and at its other end has a projecting tubular extension forming a protective tube around the threads of said threaded rod part.

5. The single-acting brake slack adjuster of claim 1, in combination with a vehicle brake system comprising a hand brake and a foot brake, brake means common to the hand brake and the foot brake, and brake riggings connecting said common brake means to the hand brake and to the foot brake, and wherein said two-part brake rod of said slack adjuster forms part of said hand brake rigging and connects the latter to the foot brake rigging and in the connection between the hand brake rigging and the foot brake rigging provides for a lost motion longitudinally of said two-part brake rod to determine the brake slack in the hand brake.

No references cited.